United States Patent [19]
Young

[11] Patent Number: 5,889,428
[45] Date of Patent: Mar. 30, 1999

[54] LOW LOSS, REGULATED CHARGE PUMP WITH INTEGRATED FERROELECTRIC CAPACITORS

[75] Inventor: Dennis Young, Colorado Springs, Colo.

[73] Assignee: Ramtron International Corporation, Colorado Springs, Colo.

[21] Appl. No.: 468,861

[22] Filed: Jun. 6, 1995

[51] Int. Cl.$^6$ ....................................................... G05F 1/10
[52] U.S. Cl. ........................... 327/536; 327/537; 327/538
[58] Field of Search .................................... 327/536, 537, 327/589, 538, 540

[56] References Cited

U.S. PATENT DOCUMENTS

| | | | |
|---|---|---|---|
| 4,839,787 | 6/1989 | Kojima et al. ............................. | 363/60 |
| 4,935,644 | 6/1990 | Tsujimoto ............................ | 307/296.2 |
| 5,039,877 | 8/1991 | Chern .................................. | 307/296.2 |
| 5,126,590 | 6/1992 | Chern .................................. | 307/296.2 |
| 5,182,529 | 1/1993 | Chern ........................................ | 331/57 |
| 5,422,586 | 6/1995 | Tedrow et al. ........................... | 327/306 |
| 5,546,031 | 8/1996 | Seesink .................................... | 327/536 |
| 5,546,044 | 8/1996 | Calligaro et al. ....................... | 327/543 |

OTHER PUBLICATIONS

On–Chip High–Voltage Generation in MNOS Integrated Circuits Using an Improved Voltage Multiplier Technique, *IEEE Journal of Solid–State Circuits,* vol. SC–11 No. 3, Jun. 1976, Dickson.

*Primary Examiner*—Timothy P. Callahan
*Assistant Examiner*—Jung Ho Kim
*Attorney, Agent, or Firm*—Peter J. Meza; William J. Kubida; Holland & Hart LLP

[57] ABSTRACT

A charge pump for increasing the value of an input voltage includes a plurality of serially coupled charge pump stages, wherein each charge pump stage includes a P-channel pass transistor coupled to a first end of a capacitor. The gates of the P-channel pass transistors and the second ends of the capacitors in odd-numbered charge pump stages receive a first phase clock signal, and the gates of the pass transistors and the second ends of the capacitors in even-numbered charge pump stages receive a second phase clock signal, except that the second end of the capacitor in the last charge pump stage is coupled to ground. To increase the value of the capacitors in an integrated circuit embodiment all of the capacitors, except for the capacitor in the last stage, are ideally ferroelectric capacitors. In a preferred embodiment, the charge pump is one component in a regulated charge pump system that also includes a voltage regulator and a controlled oscillator. In operation, the voltage regulator determines whether the boosted output voltage is greater or less than a predetermined target output voltage and accordingly selectively controls the operation of the oscillator. In turn, the charge pump is enabled to selectively charge pump the input voltage to provide a boosted output voltage if the boosted output voltage is less than a predetermined low target output voltage. Charge pumping is disabled if the boosted output voltage is greater than a predetermined high target output voltage.

22 Claims, 8 Drawing Sheets

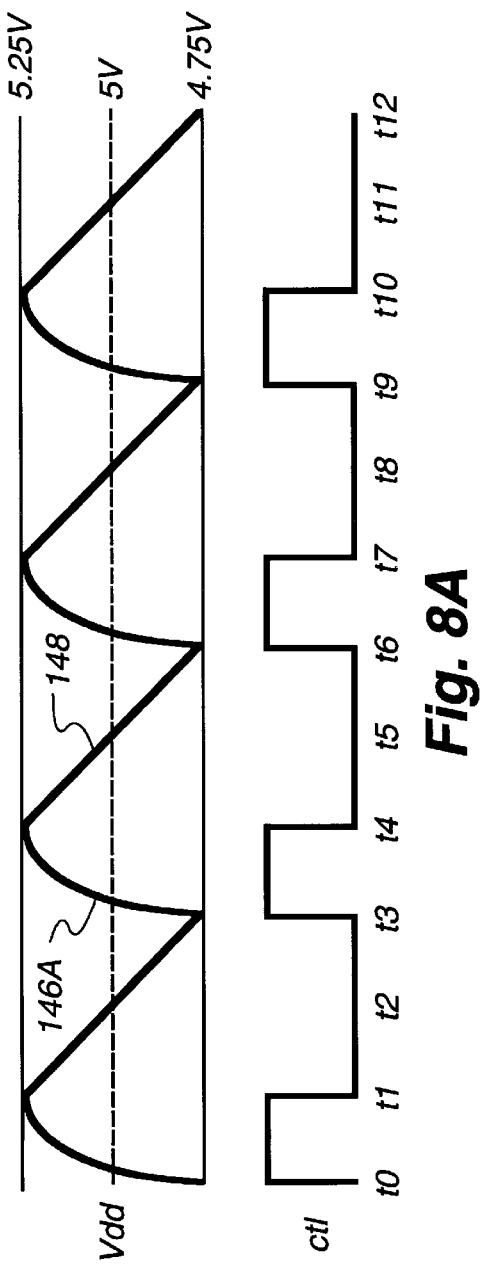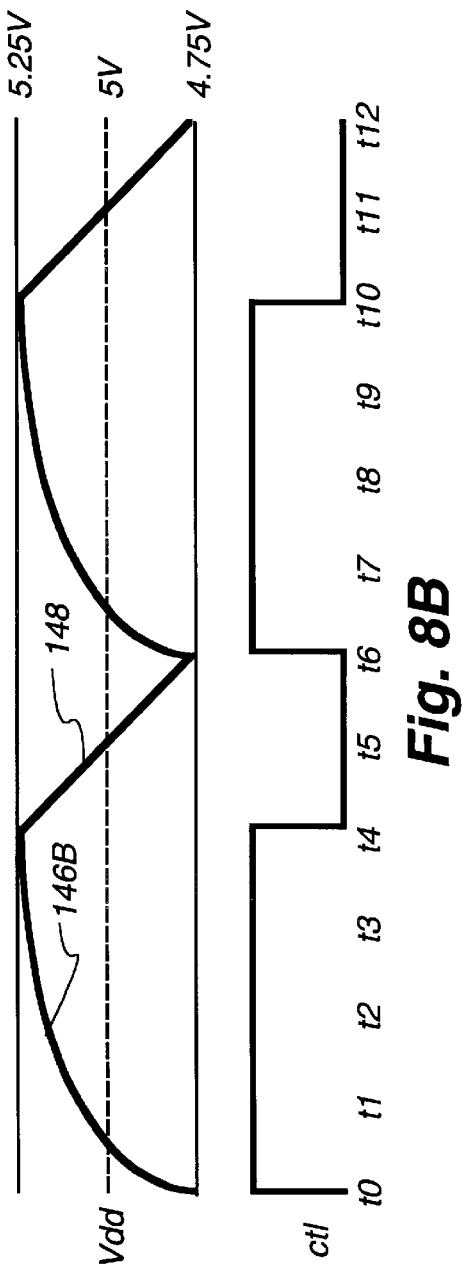

5,889,428

LOW LOSS, REGULATED CHARGE PUMP WITH INTEGRATED FERROELECTRIC CAPACITORS

BACKGROUND OF THE INVENTION

This invention relates generally to charge pumps. More particularly, the present invention relates to integrated circuit charge pumps having low voltage loss per stage and having a voltage regulated output.

A prior art charge pump 10 is shown in FIG. 1 for "pumping" a low voltage input into a higher voltage output, which can be, and usually is, higher than any external voltage supply available to an integrated circuit containing the charge pump. Charge pump 10 includes a chain of serially-connected diodes 12 in which the cathode of a diode 12 in the chain is coupled to the anode of a next diode 12 in the chain. The anode of a first diode 12 in the chain forms the voltage input, Vin, at node 26, and the cathode of a last diode 12 in the chain forms the voltage output, Vout, at node 29. Output node 29 is terminated with a capacitor 17, which is in turn coupled to ground. The cathodes of odd-numbered diodes 12 are coupled via parallel-connected capacitors 14 to bus 18. Bus 18 provides a first phase clock signal designated PH1. The cathodes of even-numbered diodes 12 are coupled via parallel-connected capacitors 16 to bus 20. Bus 20 provides a second phase clock signal designated PH2, wherein the first and second phase clocks signals are 180 degrees out of phase, or "antiphase". The first and second phase clock signals can be provided directly, or through a single oscillator input designated "oscin" at node 28. The two phase clock signals are then provided by the outputs of serially-connected inverters 22 and 24. The combination of a diode 12 with either a capacitor 14 or 16 forms a single charge pump stage.

The two clocks signals PH1 and PH2 have equal peak voltage amplitudes and are capacitively coupled to alternate cathode nodes along the diode chain. Charge pump 10 operates in a manner similar to a bucket-brigade delay line, by pumping packets of charge along the diode chain as the coupling capacitors 14 and 16 are successively charged and discharged during each half of the clock cycle. Unlike the bucket-brigade delay line, however, the voltages in the diode chain are not reset after each pumping cycle so that the average node potentials increase progressively from the input to the output of the diode chain. The output voltage at node 29 will exhibit some ripple determined by the value of output capacitor 17, the voltage magnitude of the clock signals PH1 and PH2, as well as other factors.

While charge pump 10 can be fabricated on an integrated circuit if desired, the output voltage at node 29 is unregulated and is therefore limited to an integer multiple of the input voltage in the typical circuit configuration. The output voltage at node 29 also varies as a function of the input voltage range. Further, since diodes 12 are used in the charge pump stages, the efficiency of the charge pump for low input voltages is compromised since a portion of the voltage increase attained with each charge pump stage is dissipated by the forward voltage drop ("$V_{BE}$") of each diode 12. If a large increase in voltage is required, a corresponding large number of charge pump stages are required because of the inherent loss of voltage due to the $V_{BE}$ loss in each stage. Finally, while charge pump 10 can be technically fabricated on an integrated circuit, the die size is likely to be uneconomically large because of the corresponding large size of typically used integrated silicon dioxide capacitors.

What is desired is an improved integrated circuit charge pump having a regulated output that is efficient and has a minimum number of charge pump stages to attain the desired output voltage.

SUMMARY OF THE INVENTION

It is, therefore, an object of the present invention to voltage regulate the output of a charge pump to a value not dependent upon an integer multiple of the input voltage, or on the range of the input voltage.

It is another object of the invention to minimize the number of charge pump stages needed and increase the overall efficiency of the charge pump by decreasing the voltage loss in each charge pump stage.

It is another object of the invention to minimize the die size of an integrated circuit charge pump.

It is an advantage of the invention that it is easily fabricated on an integrated circuit, with few or no external devices required.

According to the present invention a charge pump for increasing the value of an input voltage includes a plurality of serially coupled charge pump stages, wherein each charge pump stage includes a P-channel pass transistor coupled to a first end of a capacitor. The gates of the P-channel pass transistors and the second ends of the capacitors in odd-numbered charge pump stages receive a first phase clock signal, and the gates of the pass transistors and the second ends of the capacitors in even-numbered charge pump stages receive a second phase clock signal, except that the second end of the capacitor in the last charge pump stage is coupled to ground. The peak value of the clock signal voltage applied to the gates of the pass transistor in a charge pump stage increases with each successive charge pump stage and is approximately equal to the voltage at the output of the stage. In this manner, the P-channel transistor in each charge pump is completely turned off during alternate charge pump cycles so that accumulated charge is not lost. Additionally, the first and second phase clock signals for driving the capacitors in the charge pump stages are non-overlapping, which also prevents the loss of accumulated charge. The peak value of the clock signal voltage applied to the second ends of each of the capacitors is approximately equal to the voltage on the charge pump input node. To increase the value and minimize the area of the capacitors in an integrated circuit embodiment, all of the capacitors are ideally ferroelectric capacitors. To further reduce die size, the last capacitor can be external to the integrated circuit charge pump.

The charge pump further includes circuitry for providing the P-channel transistor gate voltages. This circuitry includes a first plurality of serially coupled buffer stages associated with odd-numbered charge pump stages, the output of a buffer stage providing the voltage to the gate of the pass transistor in the respective charge pump stage, and the input of a first buffer stage receiving the first phase clock signal voltage. A second plurality of serially coupled buffer stages is associated with even-numbered charge pump stages, the output of a buffer stage providing the voltage to the gate of the pass transistor in the respective charge pump stage, and the input of a first buffer stage receiving the second phase clock signal voltage. Ideally, the buffer stages each comprise a first inverter stage serially coupled to a second inverter stage, wherein the power terminal of the first inverter stage is coupled to the input of the respective charge pump stage, and the power terminal of the second inverter stage is coupled to the output of the respective charge pump stage. Ideally, the charge pump also includes diode circuitry coupled to the input of the first charge pump stage for initializing the output of each of the charge pump stages.

In a preferred embodiment, the charge pump is one component in a regulated charge pump system including a voltage input node and a voltage output node. The input of the charge pump is coupled to the voltage input node, and the output of the charge pump is coupled to the voltage output node. The charge pump further includes an oscillator input for receiving a single oscillator signal which is internally converted into the two anti-phase clock signals. When an oscillator signal is received on this input, charge pumping begins and the output signal is boosted within a few clock cycles. When the oscillator signal is removed, the output voltage of the charge pump gradually decays due to circuit current requirements, circuit loading, and parasitic leakage currents. A voltage regulator has an input coupled to the voltage output node and a control output for providing a signal indicative of whether the charge pump output voltage is above or below a desired output voltage, modified by a preset internal hysteresis range. An oscillator has a power terminal coupled to the voltage input node, a control input coupled to the voltage regulator control output, and an output coupled to the oscillator input of the charge pump. In operation, the voltage regulator determines whether the boosted output voltage is greater or less than a predetermined target output voltage and accordingly selectively controls the operation of the oscillator. In turn, the charge pump is enabled to selectively charge pump the input voltage to provide a boosted output voltage if the boosted output voltage is less than a predetermined low target output voltage. Charge pumping is disabled if the boosted output voltage is greater than a predetermined high target output voltage.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 8 is a timing diagram for the charge pump system shown in FIG. 3.

DETAILED DESCRIPTION

Figure 1:
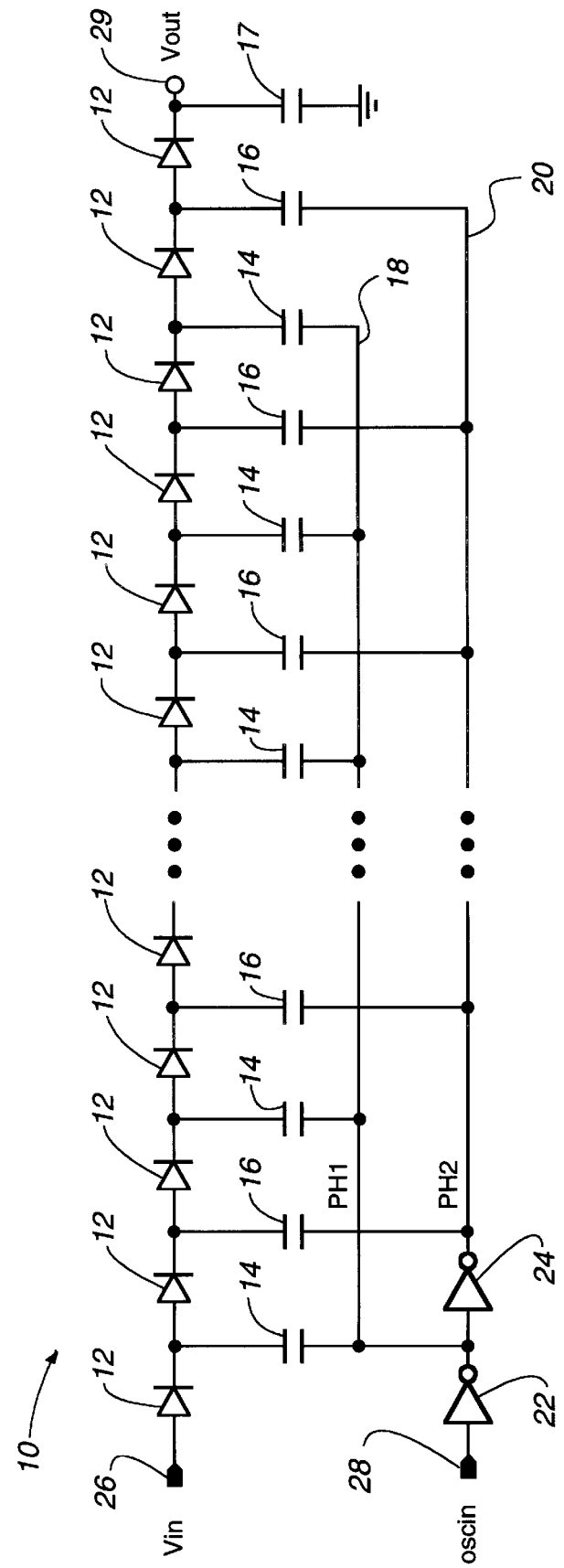
FIG. 1 is a schematic diagram of a prior art charge pump circuit.
Figure 2:
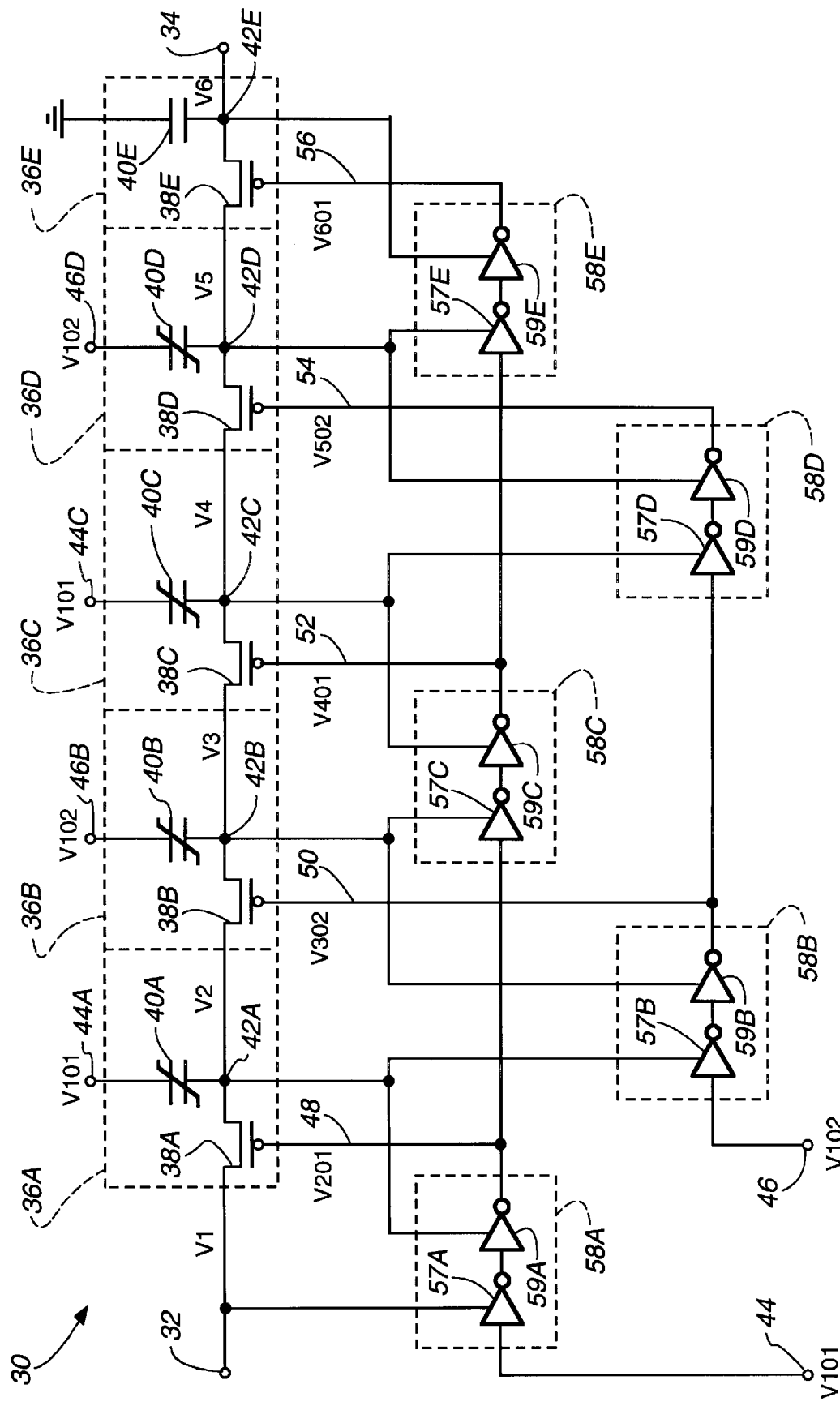
FIG. 2 is a schematic diagram of a charge pump circuit according to the present invention.

Referring now to FIG. 2, a charge pump 30 includes a charge pump input node 32 for receiving a low voltage. A charge pump output node 34 supplies a boosted voltage, which can be higher than available power supply voltages. Charge pump 30 includes a plurality of serially coupled charge pump stages 36A through 36E. Although five such stages are shown, any number greater than one can be used in charge pump 30, depending upon the desired output voltage required at node 34. The input of charge pump stage 36A forms the charge pump input node 32, and the output of charge pump stage 36E forms the charge pump output node 34.

Each charge pump stage 36A–36E includes a pass transistor 38A–38E. The first and second current nodes (source or drain) of transistors 38A–38E respectively form charge pump stage 36A–36E input and output. A capacitor 40A–40E has a first end being coupled to the respective charge pump stage 36A–36E output. The gates of the pass transistors 38A, 38C, and 38E and the second ends of the capacitors 40A and 40C in odd-numbered charge pump stages (charge pump stages 36A, 36C, and 36E in FIG. 2 correspond to odd numbers 1, 3, and 5 in the sequence of serially coupled charge pump stages) receive a first phase clock signal. The gates of pass transistors 38A, 38C, and 38E receive clock signals designated V2Ø1 on conductor 48, V4Ø1 on conductor 52, and V6Ø1 on conductor 56. Although the phase of these signals is the same, the peak voltage is not, as is described in further detail below. The second ends of capacitors 40A and 40C receive a clock signal designated V1Ø1 at respective nodes 44A and 44C. The second end of capacitor 40E, while in an "odd" charge pump stage, is in the final charge pump stage 36E in the sequence and is coupled to ground. Capacitor 40E acts as a final "peak detector" to provide a DC output voltage (with acceptable levels of ripple) at output node 34. The gates of the pass transistors 38B and 36D and the second ends of the capacitors 40B and 40D in even-numbered charge pump stages (charge pump stages 36B and 36D in FIG. 2 correspond to even numbers 2 and 4 in the sequence of serially coupled charge pump stages) receive a second phase clock signal, which is out of phase by 180 degrees from the first clock signal ("antiphase", with approximately a 50% duty cycle). The gates of pass transistors 38B and 38D receive clock signals designated V3Ø2 on conductor 50, and V5Ø2 on conductor 54. Although the phase of these signals is the same, the peak voltage is not, as is described in further detail below. The second ends of capacitors 40B and 40D receive a clock signal designated V1Ø2 at respective nodes 46B and 46D.

The peak value of the clock signal applied to the gates of the pass transistors 38A–38E at conductors 48–56 in charge pump stages 36A–36E increases with each successive charge pump stage, although the phase of the clock signal alternates. The peak value of the voltage applied to the gates of pass transistors 38A–38E is approximately equal to the peak voltage at the output of the corresponding charge pump stage 36A–36E. Having the output node and the gate node at the same voltage potential during one half of the clock signal assures that the pass transistor 38A–38E completely turns off for that portion of the clock signal and no developed charge leaks "backwards" through the chain of charge pump stages 36A–36E.

The peak value of the clock signal applied to the second ends of each of capacitors 40A–40D at nodes 44A–46D is approximately equal, although the phase of the clock signals alternates. The peak value of the clock signal applied to the second ends of each of capacitors 40A–40D is ideally approximately equal to the input voltage on the charge pump input node 32, simply because this is a readily available voltage. Although other voltages can be used, for example one-half of the input node voltage, this will force more complexity in the design because of the need for additional voltage dividers and/or voltage regulator circuits.

To obtain the highest dielectric constant, and therefore the minimum die area needed, capacitors 40A–40D are ideally integrated circuit ferroelectric capacitors, used in the non-switched linear mode. Capacitor 40E is shown to be a non-ferroelectric external capacitor having sufficient capacitance to reduce ripple at output node 34 to acceptable levels. Capacitor 40E can also be an integrated circuit ferroelectric capacitor, but because of the high value of capacitance typically needed for the peak detect function, an analysis should be done to ascertain whether or not it is economically feasible to include capacitor 40E on the integrated circuit. In charge pump 30, transistors 38A–38E are ideally P-channel MOS transistors. Charge pump 30 can be reconfigured, however, to use N-channel MOS transistors if, for example, a dual-well semiconductor process is used.

Charge pump 30 further includes circuitry for supplying the first and second phase clock signals of varying peak voltages to the gates of pass transistors 38A–38E in the respective charge pump stages 36A–36E from the two input clock signals V1Ø1 at node 44 and V1Ø2 at node 46. The two input clock signals ideally have the same peak voltage, which is the same as the input DC voltage on node 32, i. e. "V1"volts. The two input clock signals are also antiphase, and are non-overlapping. The clock signal generating circuitry includes a first plurality of serially coupled buffer stages 58A, 58C, and 58E associated with odd-numbered charge pump stages 36A, 36C, and 36E. The output of a buffer stage is coupled to the input of a next buffer stage and provides the clock signal to the gate of the pass transistor in the respective charge pump stage. For example, the output of buffer stage 58C is coupled to the input of buffer stage 58E and provides the clock signal to the gate of pass transistor 38C in charge pump stage 36C via conductor 52. The input of the first buffer stage 58A receives the first phase clock signal V1Ø1 at node 44. A second plurality of serially coupled buffer stages 58B and 58D is associated with even-numbered charge pump stages 38B and 38D. The output of buffer stage 58B is coupled to the input of a buffer stage 58D and provides the second phase clock signal V1 to the gate of the pass transistor in the respective charge pump stage, the input of a first buffer stage receiving the second phase voltage.

Each of buffer stages 58A–58E include a first inverter stage 57A–57E serially coupled to a second inverter stage 59A–59E. The power terminal of the first inverter stage 57A–57E is coupled to the input of the respective charge pump stage 36A–36E. For example, the power terminal of inverter 57A is coupled to node 32, which is the input of charge pump stage 36A; the power terminal of inverter 57E is coupled to node 42D, which is the input of charge pump stage 36E. The power terminal of the second inverter stage 59A–59E is coupled to the output of the respective charge pump stage 36A–36E.

For example, the power terminal of inverter 59A is coupled to node 42A, which is the output of charge pump stage 36A; the power 20 terminal of inverter 59E is coupled to node 42E, which is the output of charge pump stage 36E.

It is important to note that the switching threshold of inverters 57A–57E and 59A–59E be carefully adjusted so that the next inverter in the sequence will switch when driven with the output pulse from the previous inverter in the sequence. For example, the peak output voltage from inverter 59A is "V2" volts, and must drive inverter 57C, which is operated from "V3" volts. Therefore, the input threshold of inverter 57C must be set so that an input voltage of V2 volts is recognized as a valid logic "one" input. As another example, the peak output voltage from inverter 57D is "V4" volts, and must drive inverter 59D, which is operated from "V5" volts. Therefore, the input threshold of inverter 59D must be set so that an input voltage of V4 volts is recognized as a valid logic "one" input.

For a greater understanding of the operation of charge pump 30, assume that an input voltage at node 32 is one volt and a desired output voltage at node 34 is five volts. The following operating conditions are found at various circuit nodes:

TABLE I

Operating Condition for Five Stage Charge Pump

| Node Number(s) | Label | Operating Condition |
| --- | --- | --- |
| 44, 44A, 44C | V1Ø1 | 1 V Peak Clock Signal, 1st Phase |
| 46, 46B, 46D | V1Ø2 | 1 V Peak Clock Signal, 2nd Phase |
| 48 | V2Ø1 | 2 V Peak Clock Signal, 1st Phase |
| 50 | V3Ø2 | 3 V Peak Clock Signal, 2nd Phase |
| 52 | V4Ø1 | 4 V Peak Clock Signal, 1st Phase |
| 54 | V5Ø2 | 5 V Peak Clock Signal, 2nd Phase |
| 56 | V6Ø1 | 5 V Peak Clock Signal, 1st Phase |
| 32 | V1 | 1 V DC Input Voltage |
| 42A | V2 | Switched Signal, 1–2 V, 1st Phase |
| 42B | V3 | Switched Signal, 2–3 V, 2nd Phase |
| 42C | V4 | Switched Signal, 3–4 V, 1st Phase |
| 42D | V5 | Switched Signal, 4–5 V, 2nd Phase |
| 34, 42E | V6 | 5 V DC Output Voltage |

A Preferred Embodiment: Voltage Regulated Charge Pump

Figure 3:
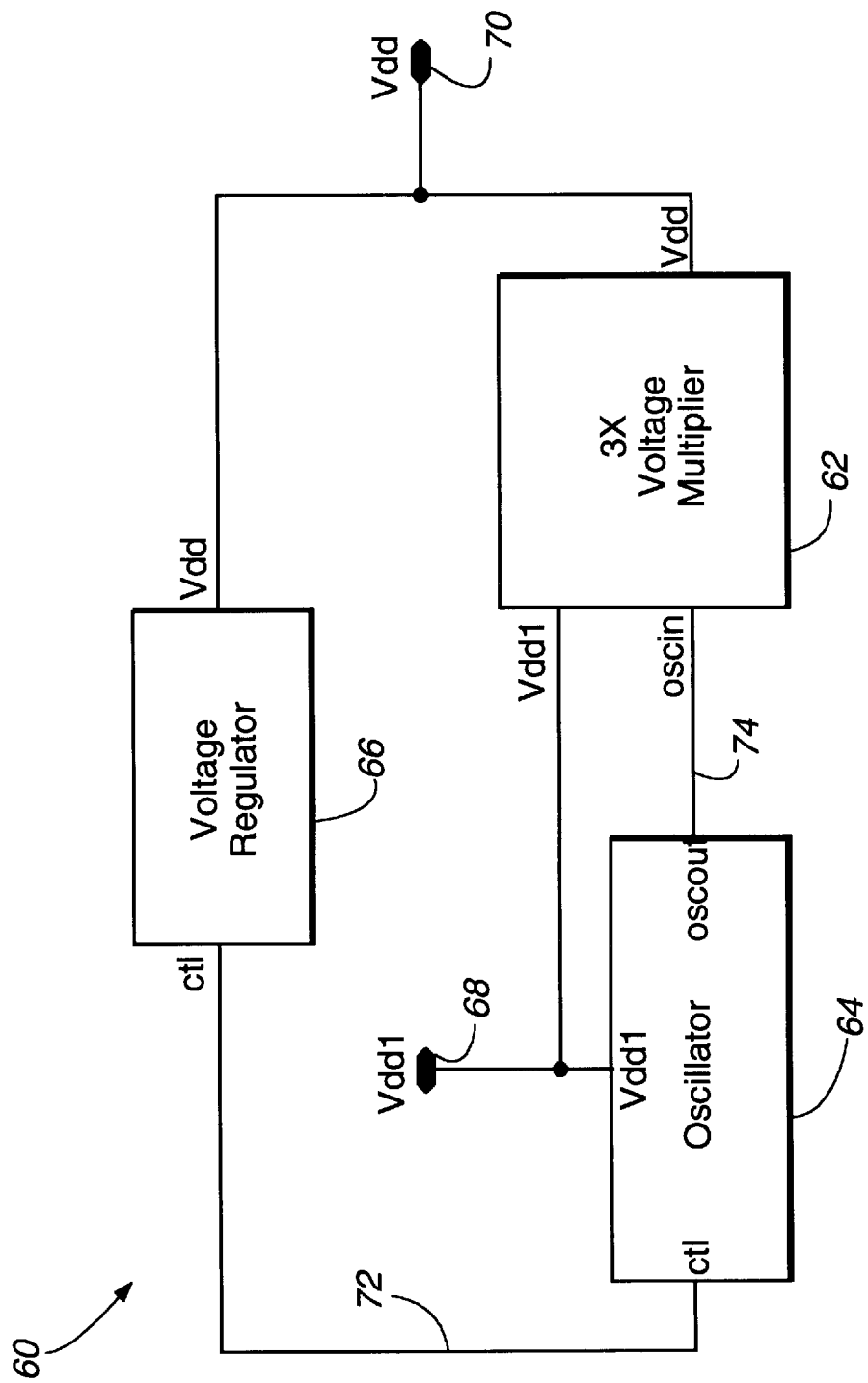
FIG. 3 is a block diagram of a voltage regulated charge pump system according to the present invention including a charge pump, an oscillator, and a voltage regulator.

Referring now to FIG. 3, a regulated charge pump system 60 includes a voltage input node 68, which receives the low input voltage Vdd1. A voltage output node 70 provides the higher output, charge pumped voltage Vdd. A three stage charge pump 62 (also known as a "voltage multiplier") has an input coupled to the voltage input node 68, an output coupled to the voltage output node 70, and an oscillator input for receiving the oscin clock signal on conductor 74. As is further explained below, three stage charge pump 62 is similar to the five stage charge pump 30 shown in FIG. 2, except that charge pump 62 receives a single clock signal at the oscillator input, and is converted internally into two antiphase clock signals, as well as other variants of the clock signal for operating the charge pump. A voltage regulator 66 has an input coupled to the voltage output node 70 and a control output for providing the "ctl" control signal on conductor 72. An oscillator 64 has a power terminal coupled to the voltage input node 68, a control input coupled to the voltage regulator control output through conductor 72, and an output coupled to the oscillator input of the charge pump through conductor 74. The circuit configuration and operation of charge pump 62, oscillator 64, and voltage regulator 66 are described in further detail below.

Figure 4:
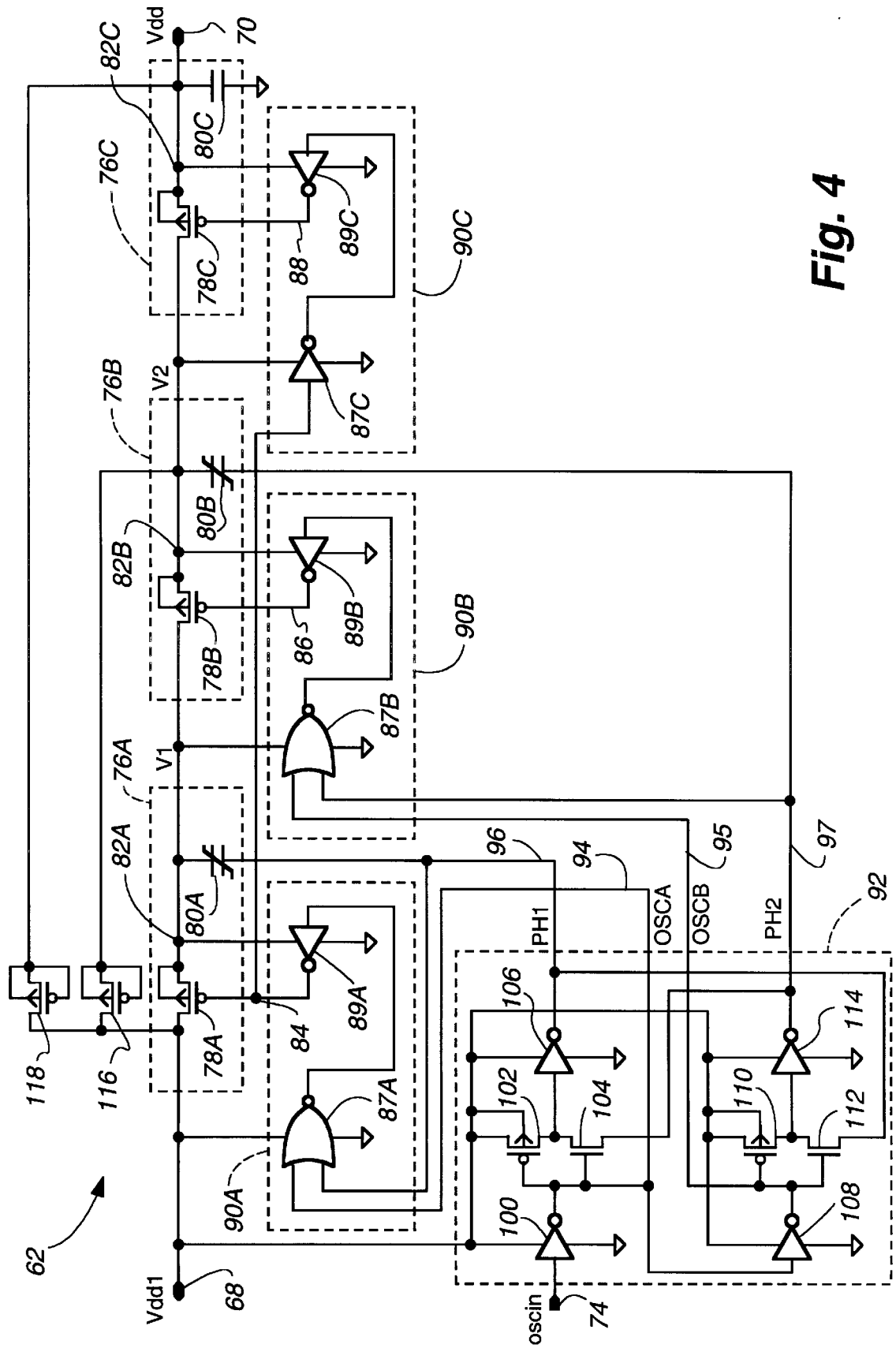
FIG. 4 is a detailed schematic diagram for the charge pump circuit shown in block diagram form in FIG. 3.

The detailed circuit diagram for charge pump 62 is shown in FIG. 4. In pertinent part, charge pump 62 includes three serially coupled charge pump stages 76A, 76B, and 76C. The output of charge pump stage 76A is coupled to the input of charge pump stage 76B at node 82A. The voltage at node 82A is designated "V1". The output of charge pump stage 76B is coupled to the input of charge pump stage 76C at node 82B. The voltage at node 82B is designated "V2". The input of charge pump stage 76A forms the charge pump input at node 68 for receiving the Vdd1 input voltage. The output of charge pump stage 76C forms the charge pump output at node 70 for generating the Vdd output voltage.

Each charge pump stage 76A–76C includes a P-channel pass transistor 78A–78C. Note that the "body" connection of the P-channel transistors is coupled to the output of the respective charge pump stage. Each charge pump stage 76A–76C further includes a capacitor coupled to the P-channel pass transistor at nodes 82A–82C. Note that capacitors 80A and 80B are ferroelectric capacitors since the dielectric strength is high, providing a desirable high value capacitor such as 0.01 microfarads when fabricated on an integrated circuit. The exact value of capacitors 80A and 80B will vary depending upon the application, and are determined by the amount of time available to reach the desired output voltage, the output load current requirements, and the switching frequency of the clock signals. The final "peak detecting" capacitor 80C is ideally a higher value than capacitors 80A and 80B such as 0.1 microfarads and is external to the integrated circuit containing charge pump 62 to minimize cost. Note that output node 70 must be connected to an external pin, which further militates in favor of making capacitor 80C an external capacitor. The exact value of capacitor 80C can of course vary according to the application, and is primarily determined by the output load current requirement.

Charge pump 62 further includes circuitry for supplying the anti-phase clock signals to the gates of the pass transistors in the respective charge pump stages, as well as to capacitors 80A and 80B. This circuitry includes logic stages 90A, 90B, and 90C as well as a four-output phase generator 92. Logic stages 90A and 90B both include a two input NOR gate 87A, 87B coupled to an inverter 89A, 89B. The inputs of NOR gate 87A receives the OSCA and PH1 clock signals from phase generator 92. The inputs of NOR gate 87B receives the OSCB and PH2 clock signals from phase generator 92. The operation of phase generator 92, as well as the timing of the OSCA, OSCB, PH1, and PH2 clock signals is described in further detail below, especially with reference to the timing diagram of FIG. 5. Inverter 89A drives the gate of P-channel pass transistor 78A at node 84, and inverter 89B drives the gate of P-channel pass transistor 78B at node 86. Logic stage 90C includes serially coupled inverters 87C and 89C. The input of inverter 87C is coupled to node 84, which is the output of inverter 89A. The output of inverter 89C drives the gate of P-channel pass transistor 78C.

Note that each of logic stages 90A–90C has two power terminals, the first of which is coupled to the input of corresponding charge pump stage 76A–76C, and the second of which is coupled to the output of corresponding charge pump stage 76A–76C. In logic block 90A, the input threshold of inverter 89A is set such that the Vdd1 output voltage level supplied by NOR gate 87A is recognized as a logic "one" level. In logic block 90B, the input threshold of inverter 89B is set such that the V1 output voltage level supplied by NOR gate 87B is recognized as a logic "one" level. In logic block 90C, the input threshold of inverter 89C is set such that the Vdd1 output voltage level supplied by NOR gate 87A is recognized as a logic "one" level.

Phase generator 92 includes a first section for generating the OSCA and PH1 clocks signals, which are 180 degrees out of phase with the input "oscin" clock signal at node 74. The first section includes inverter 100, an inverter consisting of transistors 102 and 104, and inverter 106. Inverter 100 receives the "oscin" clock signal at node 74 and provides an inverted OSCA clock signal on conductor 94, which drives one input of NOR gate 87A. Inverter 102, 104 receives the inverted clock signal and drives the input of inverter 106. Inverter 102, 104 is shown as a P-channel transistor 102 and N-channel transistor 104. Note that the "body" of P-channel transistor 102 is coupled to the source, and in turn, to input node 68. Further note that source of N-channel transistor 104 is coupled the output of inverter 114 and not to ground. This connection is to establish a non-overlapping function as is explained in further detail below. The output of inverter 102, 104 drives the input of inverter 106. The output of inverter 106 provides the PH1 clock signal on conductor 96 to the input of NOR gate 87A as well as ferroelectric capacitor 80A. The second section includes inverter 108, an inverter consisting of transistors 110 and 112, and inverter 114. Inverter 108 receives the OSCA clock signal through conductor 94 and provides a non-inverted OSCB clock signal on conductor 95, which drives one input of NOR gate 87B. Inverter 110, 112 receives the non-inverted clock signal and drives the input of inverter 114. Inverter 110, 112 is shown as a P-channel transistor 110 and N-channel transistor 112. Note that the "body" of P-channel transistor 110 is coupled to the source, and in turn, to input node 68. Further note that source of N-channel transistor 112 is coupled the output of inverter 106 and not to ground. This connection is to establish a non-overlapping function as is explained in further detail below. The output of inverter 110, 112 drives the input of inverter 114. The output of inverter 114 provides the PH2 clock signal on conductor 97 to the input of NOR gate 87B as well as ferroelectric capacitor 80B. The power terminals of inverters 100, 106, 108, and 114 are all coupled to input node 68 and are thus powered by the Vdd1 input voltage.

Charge pump 62 further includes initialization circuitry coupled to charge pump Vdd1 input node 68 (which is also the input of the first charge pump stage 76A) for initializing the output of each of the charge pump stages 76B and 76C. Diode-connected transistor 116 has an anode coupled to input node 68 and a cathode coupled to the output of charge pump stage 76B at node 82B. Diode-connected transistor 118 has an anode coupled to input node 68 and a cathode coupled to the output of charge pump stage 76C at node 82C (also identified as charge pump output node 70). Note that the gate and body of each of transistors 116 and 118 are coupled together and to the source to form a diode. In operation, a DC voltage is supplied to input node 68. This voltage, minus a diode voltage drop, is applied to nodes 82B and 82C. In this way, the charge pump stage output voltages must only be pumped up from the Vdd1 value, and not from ground. Thus, the initialization circuitry minimizes the number of cycles needed to establish the final charge pump output voltage at node 70. Within a few cycles, the voltages at the output of charge pump stages 76B and 76C (V2 and Vdd in FIG. 4) is greater than the input Vdd1 voltage and diode-connected transistors 116 and 118 both turn off.

Figure 5:
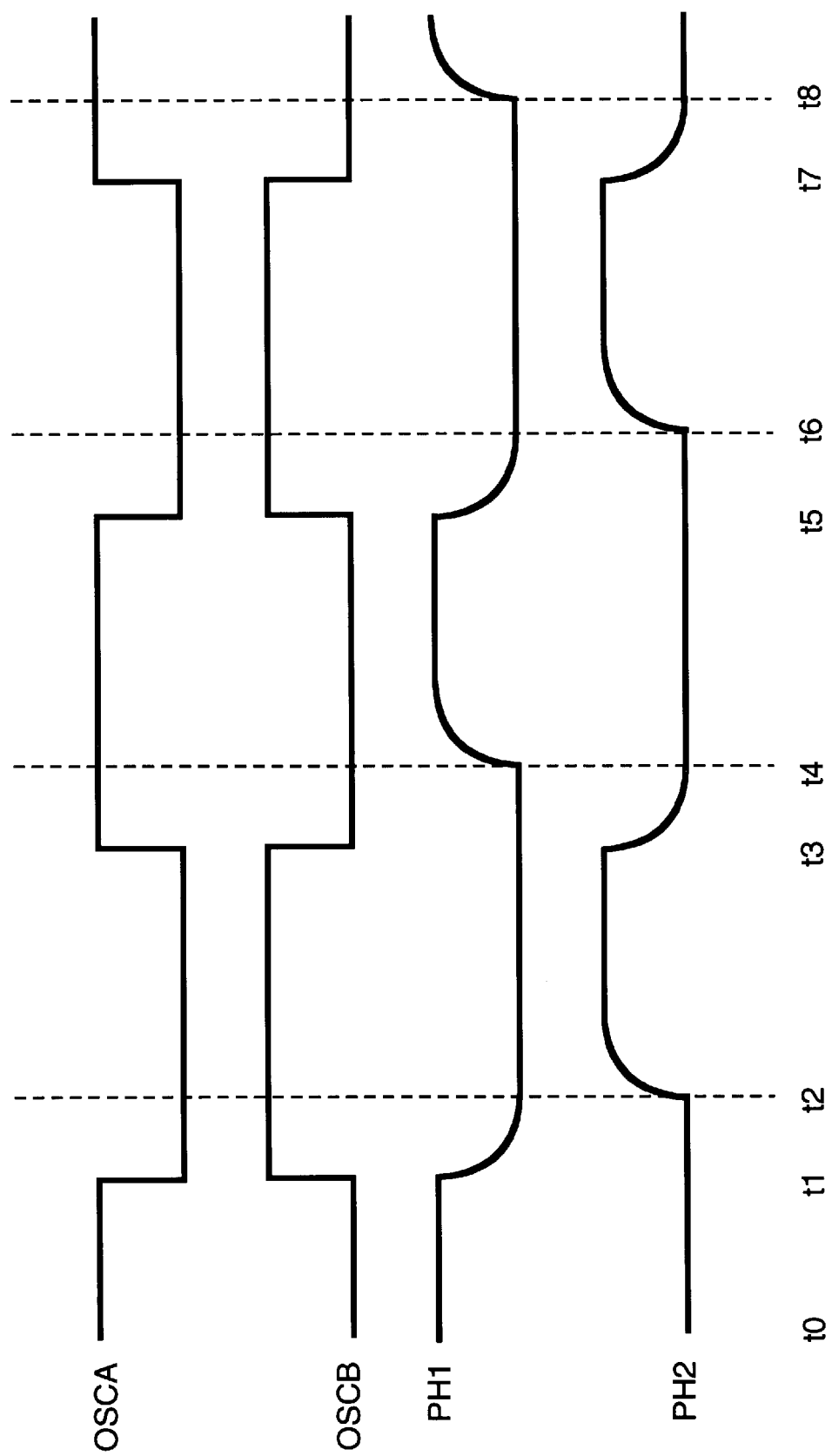
FIG. 5 is a timing diagram associated with certain nodes of the charge pump shown in FIG. 4.

Referring now to FIG. 5, a timing diagram illustrates the OSCA, OSCB, PH1, and PH2 waveforms generated by phase generator 92. The "oscin" clock signal waveform is identical to the OSCB waveform. It should first be noted that the OSCA and OSCB waveforms are simply antiphase square waves. They are not non-overlapping, but have a substantially 50% duty cycle. At time to the OSCA and PH1 clock signals are both at a logic "one" level; clock signals OSCB and PH2 are both at a logic "zero" level. At time t1 both clock signals OSCA and OSCB switch to opposite logic levels. Clock signal PH1 begins to decay immediately. The decay waveshape is due to the capacitive loading of capacitor 80A. At time t1, clock signal PH2 remains at a logic zero level. At time t2, clock signal PH1 is substantially decayed to ground potential, and PH2 begins to switch. Recall that the PH1 clock signal is used to drive the source of N-channel transistor 112, which in turn is used to generate the PH2 clock signal. In other words, inverter 110, 112 does not switch until the source of transistor 112 is returned close to ground potential. At time t3 clock signals OSCA and OSCB again switch. Clock signal PH2 immediately decays, but clock signal PH1 does not begin charging until time t4. The behavior of the clock signal waveforms at times t1–t4 is repeated for an illustrated second cycle at times t5–t8. It can be seen from the waveforms of FIG. 5 that the PH1 and PH2 clock signals, which are used to drive capacitors 80A and 80B, respectively, are non-overlapping. This is desirable since the capacitors are switched in a manner that conserves charge at nodes 82A and 82B. Capacitors 80A and 80B are only switched when transistors 78A and 78B are completely off.

Charge pump 62 operates in the regulated charge pump system 60 shown in block diagram form in FIG. 3. Two other circuit blocks, a controlled oscillator 64 and voltage regulator 64 are described in further detail below. For a greater understanding of charge pump 62 in the regulated charge pump system 60 assume that an input voltage at node 68 has a voltage input range of 1.9 volts to 4.9 volts and a desired output voltage at node 70 of 5 volts, plus or minus 0.25 volts. Tables II below sets forth the voltages at various charge pump circuit nodes for an input voltage at the low end of the range, i.e. 1.9 volts. Table III below sets forth the voltages at various charge pump circuit nodes for an input voltage at the high end of the range, i.e. 4.9 volts. The 1st Phase nomenclature in Tables II and III refers to a signal being in phase with the "oscin" input clock signal, and the 2nd Phase nomenclature in Tables II and III refers to a signal being out of phase with the "oscin" input clock signal.

TABLE II

Operating Condition for Three Stage Charge Pump (Vdd1 = 1.9 volts)

| Node Number(s) | Label | Operating Condition |
|---|---|---|
| 94 | OSCA | 1.9 V Pk Clock Signal, 2nd Phase |
| 95 | OSCB | 1.9 V Pk Clock Signal, 1st Phase |
| 96 | PH1 | 1.9 V Pk Clock Signal, 2nd Phase |
| 97 | PH2 | 1.9 V Pk Clock Signal, 1st Phase |
| 68 | Vdd1 | 1.9 V DC Input Voltage |
| 82A | V1 | Switched Signat, 1.9–3.8 V |
| 82B | V2 | Switched Signal, 3.8–5.7 V |
| 82C, 70 | Vdd | 5 V +/− 0.25 DC Output Voltage |

Note that the unregulated output voltage at node 82C would have been 5.7 volts DC, which is three times the input voltage of 1.9 volts DC.

TABLE III

Operating Condition for Three Stage Charge Pump (Vdd1 = 4.9 volts)

| Node Number(s) | Label | Operating Condition |
|---|---|---|
| 94 | OSCA | 4.9 V Pk Clock Signal, 2nd Phase |
| 95 | OSCB | 4.9 V Pk Clock Signal, 1st Phase |
| 96 | PH1 | 4.9 V Pk Clock Signal, 2nd Phase |
| 97 | PH2 | 4.9 V Pk Clock Signal, 1st Phase |
| 68 | Vdd1 | 4.9 V DC Input Voltage |
| 82A | V1 | Switched Signal, 4.9–9.8 V |
| 82B | V2 | Switched Signal, 9.8–14.7 V |
| 82C, 70 | Vdd | 5 V +/− 0.25 DC Output Voltage |

Note that the unregulated output voltage at node 82C would have been 14.7 volts DC, which is three times the input voltage of 4.9 volts DC.

Figure 6:
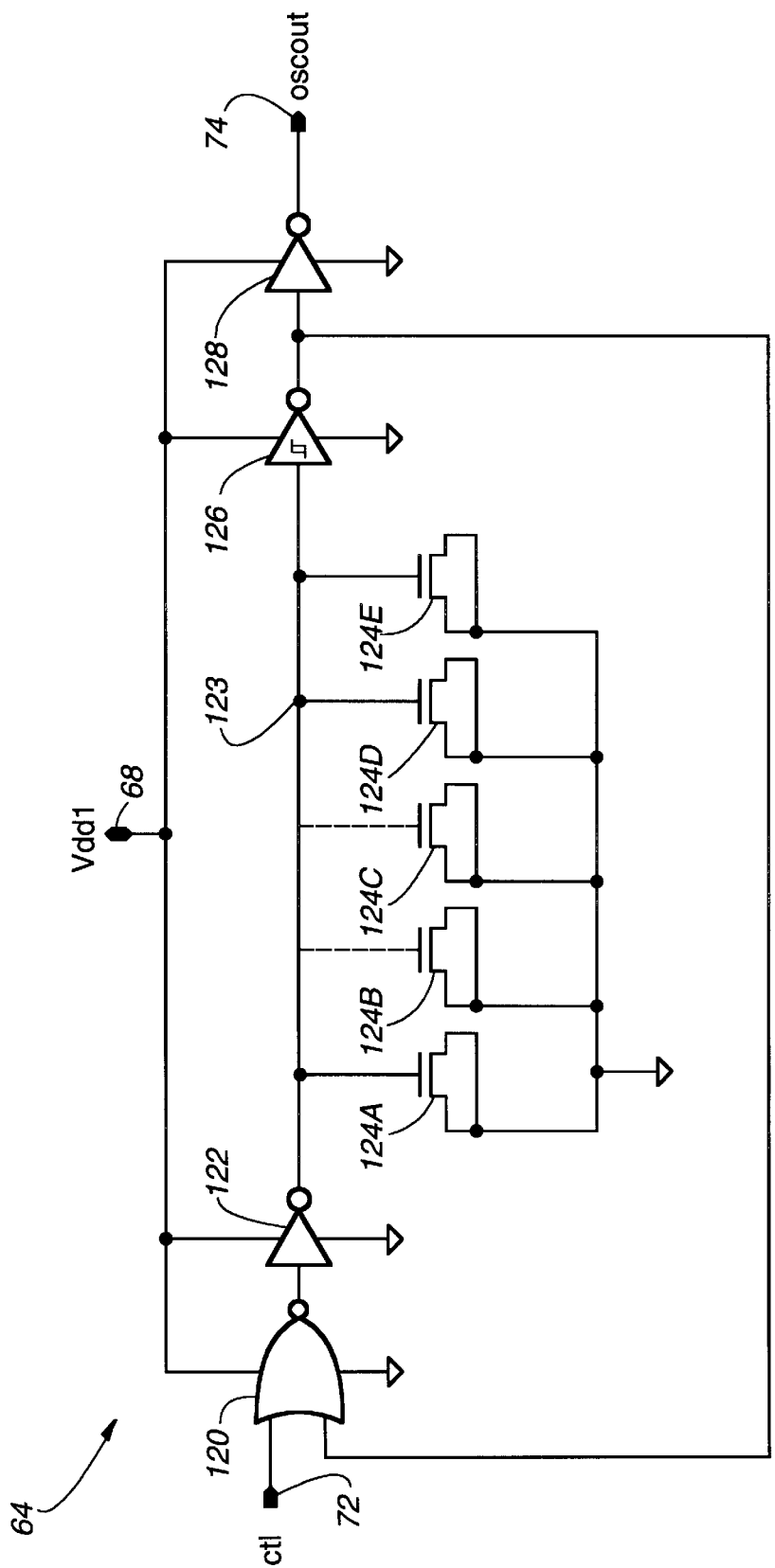
FIG. 6 is a detailed schematic diagram for the oscillator circuit shown in block diagram form in FIG. 3.

The output voltage Vdd at node 70 is regulated in a preferred embodiment of the present invention. Two additional circuit blocks, controlled oscillator 64 and voltage regulator 66, provide the voltage regulation. Turning now to FIG. 6, oscillator 64 includes a two input NOR gate 120, wherein one of the inputs receives the "ctl" signal at node 72. The "ctl" signal controls oscillator 64 so that when the "ctl" signal is at a logic one level, an oscillating signal designated "oscout" (which can also be deemed a "controlled clock signal") is presented at output node 74. When the "ctl" signal is at a logic zero level, the controlled clock signal at node 74 is absent and a ground potential is presented. The output of NOR gate 120 drives the input of inverter 122. The output of inverter 122 drives intermediate node 123, which is coupled to a plurality of capacitor-coupled transistors 124A–124E. The gate capacitance of each of the transistors 124A–124E is provided by using the gate as a first capacitor plate and the shorted drain and source as the second capacitor plate. Five capacitor-coupled transistors are shown in FIG. 6, wherein transistors 124A, 124D, and 124E are hard-wired to intermediate node 123. A total capacitance of about one picofarad is presented by these three transistors for an oscillating frequency of about one megahertz at 1.9 volts. Additional transistors 124B and 124C can be coupled to intermediate node 123 by metal mask programming on the integrated circuit for an additional capacitance of about 1.7 picofarads. Capacitor-coupled transistors 124A–124E are binarily weighted and can be added or subtracted as desired for a given application. Although five such transistors are shown in FIG. 6, any number can be used. A higher number will give finer granularity in the selection of oscillation frequency. An acceptable range of frequency for the "oscout" clock signal is from about one megahertz to about two megahertz. Intermediate node 123 is also coupled to the input of Schmitt trigger inverter 126, which converts the substantially sinusoidal oscillating signal at intermediate node 123 into a full logic level square wave signal. The output of inverter 123 is coupled back to the other input of NOR gate 120 as positive feedback, which creates the oscillation. The output of inverter 126 is also coupled to the input inverter 128. The output of inverter 128 in turn, is the output node 74 of oscillator 64. The power terminals of NOR gate 120, inverter 122, Schmitt trigger inverter 126, and inverter 128 are all coupled to node 68 for receiving the Vdd1 lower voltage input voltage.

Figure 7:
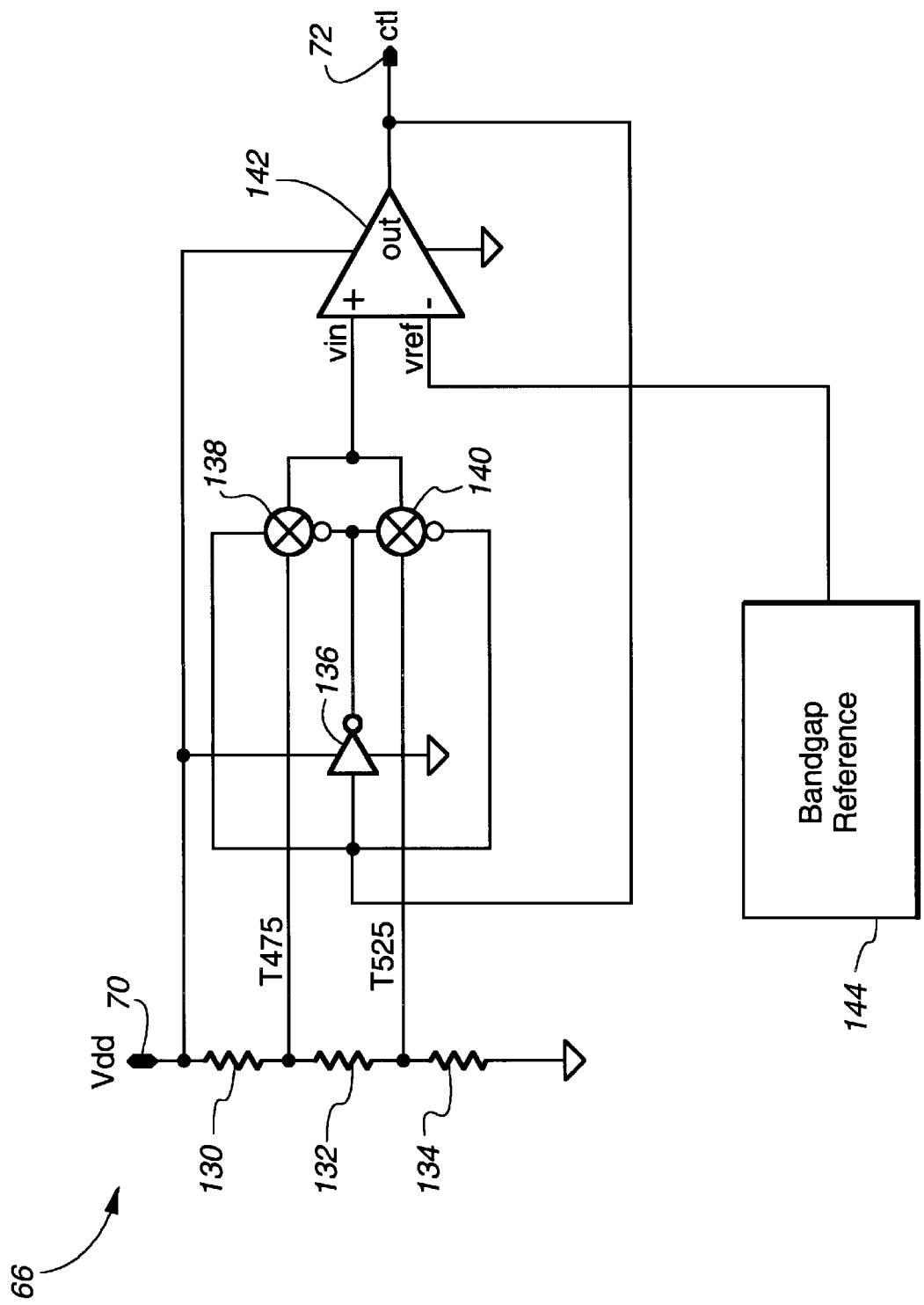
FIG. 7 is a detailed schematic diagram for the voltage regulator circuit shown in block diagram form in FIG. 3.

Turning now to FIG. 7, a voltage regulator 66 includes a resistor string 130, 132, 134, coupled to the regulator input at node 70. The resistor string has first and second taps designated T475 and T525. The tap voltages represent the "low" and "high" values of desired voltage regulation. The "ctl" output signal is a logic one value in response to the Vdd output voltage dropping below 4.75 volts, and is a logic zero value in response to the Vdd output voltage climbing above 5.25 volts. The target regulated voltage is thus 5 volts, plus or minus 0.25 volts. The actual tap voltages are calculated with reference to the bandgap voltage of 1.2 volts provided by a bandgap reference generator 144. Ideally resistor 130 has a value of 747K ohms, resistor 132 has a value of 24K ohms, and resistor 134 has a value of 228K ohms. Other resistance values, of course, can be used and are determined by the desired tap values for other applications, as well as operating current specifications. A first multiplexer 138 has an input coupled to the T475 tap, an output, and two complementary control inputs. A second multiplexer 140 has an input coupled to the T525 tap, an output, and two complementary control inputs. A comparator 142 has a positive input coupled to the outputs of the multiplexers 138 and 140, a negative input for receiving the bandgap voltage, and an output forming the control output of the voltage regulator at node 72 and for controlling the control inputs of the multiplexers 138 and 140. The multiplexers are controlled either directly by the output of comparator 142 or through inverter 136.

In operation, the regulated charge pump system 60 of FIG. 3 generates a boosted, regulated voltage Vdd at node 70 by determining whether the boosted output voltage Vdd is greater or less than a predetermined target output voltage, within preset hysteresis limits, and then selectively charge pumping the Vdd1 input voltage at node 68 to provide a boosted output voltage if the boosted output voltage is less than the predetermined target output voltage, within the preset hysteresis limit. The charge pumping of the Vdd1 input voltage is suspended if the boosted output voltage is greater than the predetermined target output voltage, again within the preset hysteresis limit.

The voltage regulation operation can be clearly seen in the combined timing/waveform diagrams of FIG. 8A and FIG. 8B. In FIG. 8A the output voltage Vdd waveform is shown having four complete cycles, corresponding to a high input voltage such at 4.9 volts. A leading edge portion 146A of the waveform indicates that charge pump 62 is enabled and the output voltage Vdd is increasing. Once the 5.25 volt upper hysteresis threshold is attained, charge pump 62 is disabled and a linear trailing edge portion 148 of the Vdd waveform is shown. The trailing edge portion 148 continues until the 4.75 volt lower hysteresis threshold is attained, and charge pump 62 is once again enabled. The corresponding "ctl" waveform is also shown in FIG. 8A. The ctl waveform is active high during the leading edge portions 146A of the Vdd waveform. In FIG. 8B the output voltage Vdd waveform is shown having only two complete cycles, corresponding to a low input voltage such at 1.9 volts. A much longer leading edge portion 146B of the waveform indicates that charge pump 62 is enabled and the output voltage Vdd is increasing. Once the 5.25 volt upper hysteresis threshold is attained, charge pump 62 is disabled and the same linear trailing edge portion 148 of the Vdd waveform is shown. This is because the linear trailing edge decay is primarily determined by the total current load on charge pump 62. The trailing edge portion 148 continues until the 4.75 volt lower hysteresis threshold is attained, and charge pump 62 is once again enabled. The corresponding "ctl" waveform is also shown in FIG. 8B. The ctl waveform is active high during the leading edge portions 146A of the Vdd waveform. Note the greater active high duty cycle of the ctl waveform in FIG. 8B, corresponding to charge pump 62 being enabled for a longer time to attain the same output voltage.

Having described and illustrated the principles of the invention in a preferred embodiment thereof, it is appreciated by those having skill in the art that the invention can be modified in arrangement and detail without departing from such principles. For example, the clock signal frequencies and voltages, number of charge pump stages, output voltage level and regulation limits can all be changed to suit a particular application. Additionally, the voltage polarities used, and type of transistors used in the various circuits presented herein can all be changed by modifications known to those having ordinary skill in the art. I therefore claim all modifications and variation coming within the spirit and scope of the following claims.

I claim:

1. A charge pump comprising:
 a charge pump input node for receiving a first voltage;
 a charge pump output node for generating a second voltage; and
 a plurality of serially coupled charge pump stages each having an input and an output, wherein the output of a charge pump stage is coupled to the input of a next charge pump stage, the input of a first charge pump stage forming the charge pump input node, and the output of a last charge pump stage forming the charge pump output node, wherein each charge pump stage comprises:
 a pass transistor having a gate, and first and second current nodes respectively coupled to the charge pump stage input and output; and
 a capacitor having first and second ends, the first end being coupled to the charge pump stage output,
 wherein the gates of the pass transistors and the second ends of the capacitors in odd-numbered charge pump stages receive a first phase voltage, and the gates of the pass transistors and the second ends of the capacitors in even-numbered charge pump stages receive a second phase voltage, except that the second end of the capacitor in the last charge pump stage is coupled to ground.

2. A charge pump as in claim 1 in which the peak value of the voltage applied to the gates of the pass transistor in the charge pump stages increases with each successive charge pump stage.

3. A charge pump as in claim 1 in which the peak value of the voltage applied to the gates of the pass transistor in a charge pump stage is approximately equal to the voltage at the output of the stage.

4. A charge pump as in claim 1 in which the peak value of the voltage applied to the second ends of each of the capacitors is approximately equal.

5. A charge pump as in claim 1 in which the peak value of the voltage applied to the second ends of each of the capacitors is approximately equal to the first voltage on the charge pump input node.

6. A charge pump as in claim 1 in which all of the capacitors, except for the capacitor in the last stage, are ferroelectric capacitors.

7. A charge pump as in claim 1 in which all of the transistors are P-channel MOS transistors.

8. A charge pump as in claim 1 further comprising means for supplying the first and second phase voltages to the gates of the pass transistors in the respective stages.

9. A charge pump as in claim 8 in which the supplying means comprises:
 a first plurality of serially coupled buffer stages associated with odd-numbered charge pump stages, each buffer stage having an input and an output, wherein the output of a buffer stage is coupled to the input of a next buffer stage and provides the voltage to the gate of the pass transistor in the respective charge pump stage, the input of a first buffer stage receiving the first phase voltage; and
 a second plurality of serially coupled buffer stages associated with even-numbered charge pump stages, each buffer stage having an input and an output, wherein the output of a buffer stage is coupled to the input of a next buffer stage and provides the voltage to the gate of the pass transistor in the respective charge pump stage, the input of a first buffer stage receiving the second phase voltage.

10. A charge pump as in claim 9 in which the buffer stages each comprise a first inverter stage serially coupled to a second inverter stage.

11. A charge pump as in claim 10 in which a power terminal of the first inverter stage is coupled to the input of the respective charge pump stage.

12. A charge pump as in claim 10 in which a power terminal of the second inverter stage is coupled to the output of the respective charge pump stage.

13. A charge pump as in claim 1 in which the number of charge pump stages is equal to three.

14. A regulated charge pump comprising:

a voltage input node;

a voltage output node;

a charge pump having an input coupled to the voltage input node, an output coupled to the voltage output node, and an oscillator input, in which the charge pump comprises a plurality of serially coupled charge pump stages each having an input and an output, wherein the output of a charge pump stage is coupled to the input of a next charge pump stage, the input of a first charge pump stage forming the charge pump input node, and the output of a last charge pump stage forming the charge pump output node, wherein each charge pump stage comprises a pass transistor having a gate, and first and second current nodes respectively coupled to the charge pump stage input and output, and a capacitor having first and second ends, the first end being coupled to the charge pump stage output, wherein the gates of the pass transistors and the second ends of the capacitors in odd-numbered charge pump stages receive a first phase voltage, and the gates of the pass transistors and the second ends of the capacitors in even-numbered charge pump stages receive a second phase voltage, except that the second end of the capacitor in the last charge pump stage is coupled to ground;

a voltage regulator having an input coupled to the voltage output node and a control output; and an oscillator having a power terminal coupled to the voltage input node, a control input coupled to the voltage regulator control output, and an output coupled to the oscillator input of the charge pump.

15. A regulated charge pump as in claim 14 further comprising means for supplying the first and second phase voltages to the gates of the pass transistors in the respective stages.

16. A regulated charge pump as in claim 15 in which the supplying means further comprises means for supplying non-overlapping first and second phase voltages to the capacitors in the charge pump stages.

17. A regulated charge pump as in claim 14 further comprising means coupled to the input of the first charge pump stage for initializing the output of each of the charge pump stages.

18. A regulated charge pump comprising:

a voltage input node;

a voltage output node;

a charge pump having an input coupled to the voltage input node, an output coupled to the voltage output node, and an oscillator input;

a voltage regulator having an input coupled to the voltage output node and a control output in which the voltage regulator comprises a resistor string coupled to the regulator input having first and second taps, a first multiplexer having an input coupled to the first tap, an output, and a control input, and a second multiplexer having an input coupled to the second tap, an output, and a control input, and a comparator having a first input coupled to the outputs of the first and second multiplexers, a second input for receiving a bandgap voltage, and an output forming the control output of the voltage regulator and for controlling the control inputs of the first and second multiplexers; and an oscillator having a power terminal coupled to the voltage input node, a control input coupled to the voltage regulator control output, and an output coupled to the oscillator input of the charge pump.

19. A regulated charge pump as in claim 18 in which the charge pump comprises:

a plurality of serially coupled charge pump stages each having an input and an output, wherein the output of a charge pump stage is coupled to the input of a next charge pump stage, the input of a first charge pump stage forming the charge pump input node, and the output of a last charge pump stage forming the charge pump output node, wherein each charge pump stage comprises:

a pass transistor having a gate, and first and second current nodes respectively coupled to the charge pump stage input and output; and a capacitor having first and second ends, the first end being coupled to the charge pump stage output, wherein the gates of the pass transistors and the second ends of the capacitors in odd-numbered charge pump stages receive a first phase voltage, and the gates of the pass transistors and the second ends of the capacitors in even-numbered charge pump stages receive a second phase voltage, except that the second end of the capacitor in the last charge pump stage is coupled to ground.

20. A regulated charge pump as in claim 19 further comprising means for supplying the first and second phase voltages to the gates of the pass transistors in the respective stages.

21. A regulated charge pump as in claim 20 in which the supplying means further comprises means for supplying non-overlapping first and second phase voltages to the capacitors in the charge pump stages.

22. A regulated charge pump as in claim 19 further comprising means coupled to the input of the first charge pump stage for initializing the output of each of the charge pump stages.

* * * * *